US011818404B2

(12) United States Patent
Crane et al.

(10) Patent No.: US 11,818,404 B2
(45) Date of Patent: *Nov. 14, 2023

(54) THUMBNAIL OF CONTENT VIDEO TO PROVIDE CONTEXT TO AD VIDEO PLAYBACK

(71) Applicant: GOOGLE LLC, Mountain View, CA (US)

(72) Inventors: Nicola Ann Crane, San Francisco, CA (US); Jamieson Kerns, Santa Monica, CA (US); Shiva Jaini, Mountain View, CA (US); Thomas James Broxton, San Francisco, CA (US); Ramesh Sarukkai, Los Gatos, CA (US)

(73) Assignee: GOOGLE LLC, Mountain View, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 17/376,492

(22) Filed: Jul. 15, 2021

(65) Prior Publication Data

US 2021/0344980 A1 Nov. 4, 2021

Related U.S. Application Data

(63) Continuation of application No. 15/201,354, filed on Jul. 1, 2016, now Pat. No. 11,089,342, which is a continuation of application No. 13/480,433, filed on May 24, 2012, now Pat. No. 9,386,328.

(60) Provisional application No. 61/565,218, filed on Nov. 30, 2011.

(51) Int. Cl.
*H04N 21/234* (2011.01)
*H04N 5/272* (2006.01)
*H04N 21/81* (2011.01)
*H04N 21/8355* (2011.01)
*H04N 21/431* (2011.01)
*H04N 21/4627* (2011.01)
*H04N 21/2387* (2011.01)
*H04N 21/472* (2011.01)
*H04N 21/475* (2011.01)
*H04N 21/858* (2011.01)

(52) U.S. Cl.
CPC ....... *H04N 21/23424* (2013.01); *H04N 5/272* (2013.01); *H04N 5/2723* (2013.01); *H04N 21/2387* (2013.01); *H04N 21/4312* (2013.01); *H04N 21/4627* (2013.01); *H04N 21/4758* (2013.01); *H04N 21/47217* (2013.01); *H04N 21/812* (2013.01); *H04N 21/8355* (2013.01); *H04N 21/858* (2013.01)

(58) Field of Classification Search
CPC ............ H04N 21/23424; H04N 5/272; H04N 5/2723; H04N 21/2387; H04N 21/4312; H04N 21/4627; H04N 21/47217; H04N 21/4758; H04N 21/812; H04N 21/8355; H04N 21/858
See application file for complete search history.

*Primary Examiner* — Jeff A Burke
*Assistant Examiner* — Sihar A Karwan
(74) *Attorney, Agent, or Firm* — MARSHALL, GERSTEIN & BORUN LLP

(57) ABSTRACT

This disclosure relates to systems and methods for displaying of thumbnails of content to be played after viewing of a video advertisement. A method includes generating a thumbnail associated with video content, the video content to be provided for playback after playback of a video advertisement, and presenting the thumbnail during the playback of the video advertisement to inform a user of the video content, wherein a skip counter indicative of time left until skipping of the video advertisement is enabled is provided, and wherein the time left is less than a remaining playing time of the video advertisement.

26 Claims, 8 Drawing Sheets

THUMBNAIL OF CONTENT VIDEO TO PROVIDE CONTEXT TO AD VIDEO PLAYBACK

CROSS-REFERENCE TO RELATED APPLICATION

This application claims the benefit of priority as a continuation of U.S. Non-Provisional patent application Ser. No. 15/201,354, filed Jul. 1, 2016, entitled "THUMBNAIL OF CONTENT VIDEO TO PROVIDE CONTEXT TO AD VIDEO PLAYBACK," which is a continuation of U.S. Non-Provisional patent application Ser. No. 13/480,433 filed on May 24, 2012, entitled "THUMBNAIL OF CONTENT VIDEO TO PROVIDE CONTEXT TO AD VIDEO PLAYBACK" which further claims priority to U.S. Provisional Patent Application No. 61/565,218, filed on Nov. 30, 2011, entitled "THUMBNAIL OF CONTENT VIDEO TO PROVIDE CONTEXT TO AD VIDEO PLAYBACK", each of which is incorporated herein by reference.

TECHNICAL FIELD

This disclosure relates to systems and methods for displaying of thumbnails of content to be played after viewing of a video advertisement.

BACKGROUND

Conventionally, users who are shown a pre-roll in-stream video advertisement often times do not have context about the video they intended to watch. Consequently, the users may be confused about what is being watched (e.g., the advertisement or the content to be displayed after the advertisement), and they may abandon the video because they are not willing to wait through the pre-roll.

SUMMARY

A simplified summary is provided herein to help enable a basic or general understanding of various aspects of exemplary non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

In accordance with a non-limiting implementation, a thumbnail component generates a thumbnail of video content to be displayed after viewing a video advertisement, and a presentation component presents the thumbnail prior to or during the video advertisement to inform a user of the video content that will be displayed after the advertisement.

In accordance with another non-limiting implementation, a thumbnail is generated of video content that is to be displayed after viewing a video advertisement, and the thumbnail is presented prior to or during the video advertisement to inform a user of the video content that will be displayed after the advertisement.

These and other implementations and embodiments are described in more detail below.

DETAILED DESCRIPTION OVERVIEW

Figure 1:
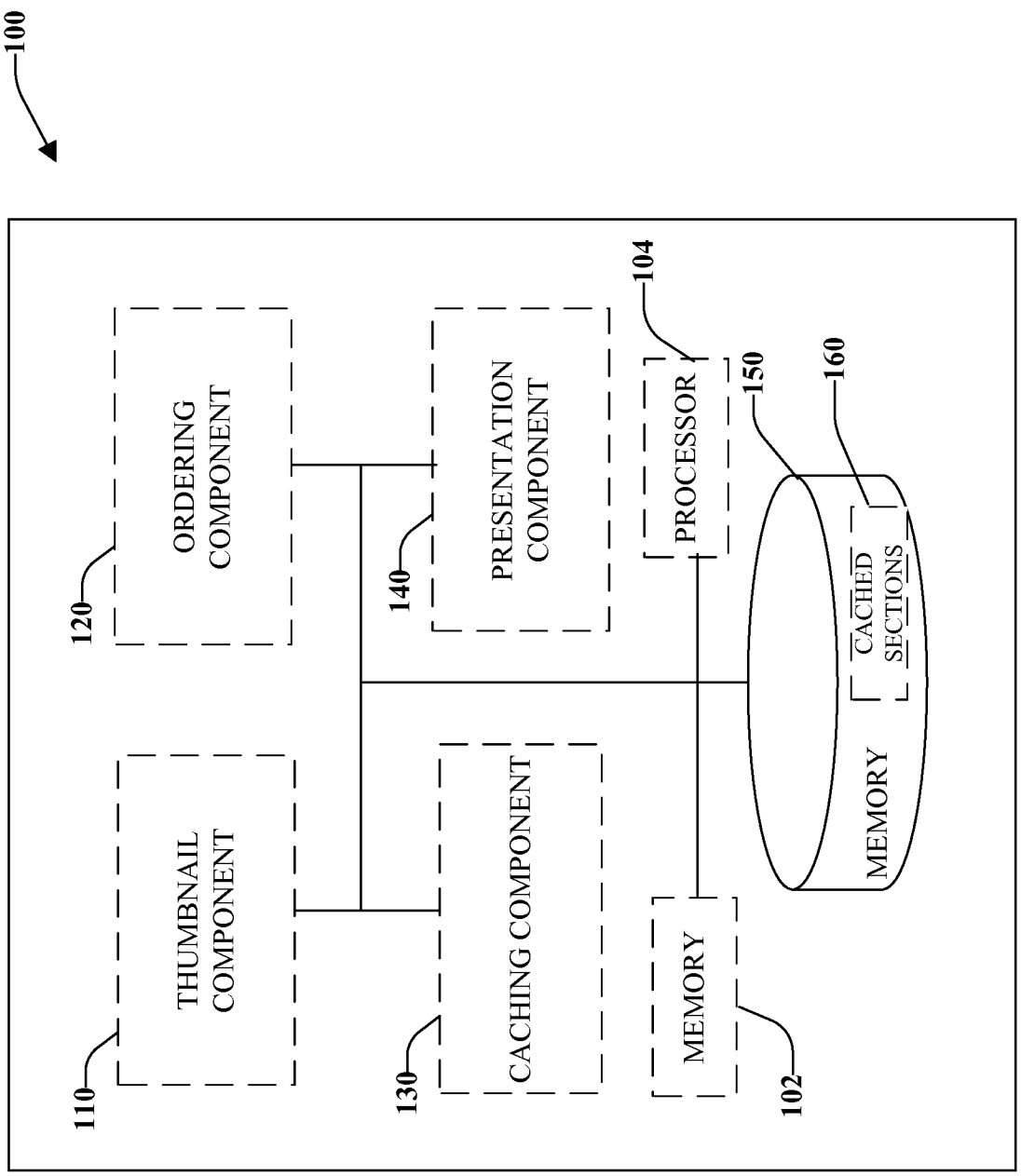
FIG. 1 illustrates a block diagram of an exemplary non-limiting system for providing advertising content in conjunction with one or more thumbnails of content to be viewed after the advertisement in accordance with an implementation of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing this disclosure.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

By way of introduction, the subject matter described in this disclosure relates to presentation of video advertisements (e.g., promoted videos, video ads), and providing thumbnail views of content to be played after the video advertisement. Conventionally, users who are shown a pre-roll in-stream video advertisement oftentimes do not have context about the video they intended to watch. Consequently, the users may be confused about what is being watched (e.g., the video advertisement or the content to be displayed after the advertisement), and they may abandon the video because they are not willing to wait through the pre-roll in-stream video advertisement.

In accordance with an embodiment, a system concurrently displays to users a video advertisement and a thumbnail view of content video to be played after the video advertisement being watched is completed. It is to be appreciated that the content video can be one selected by the user, in a user's playlist, or an automatically selected content video for the user, for example, based upon inferred interests of the user. Optionally, the thumbnail of the content video can be presented before playing a pre-roll video ad to identify to the user the content video that will be played after the video ad is completed or skipped. For example, this can be done while the video ad is loading. In another option, the thumbnail can be tailored to fade or fill-in as the advertisement is playing. For example, as the advertisement progresses the thumbnail can fade in from sparse detail to richer detail. By fading in greater detail of the upcoming content video, the user can be enticed into completing viewing of the advertisement. Thus, greater advertisement revenue can be generated (e.g., on a cost per view basis, or cost per length of view basis). Additionally, probability of user viewing of the upcoming content video is increased.

In addition to or instead of showing the thumbnail image before the ad, a thumbnail image can be overlaid on top of the pre-roll video ad, as a picture-in-picture. In an embodiment, pre-loading/buffering time of the advertisement video can be used to display an explanation of why the ad is showing.

In some implementations, the thumbnail image can be displayed above, below, or next to the player showing the video ad, or in any other suitable manner. Regardless of positioning of the thumbnail, if the ad was enabled to be skipped, the user could click the thumbnail image to skip the ad and start watching the content video. It is to be appreciated that thumbnails can be interactive, such as clickable, hover over to preview associated video content, or other interactive options.

Example Tailored Adverting Content Distribution Based on a Playlist Format

Referring now to the drawings, with reference initially to FIG. 1, an advertising delivery system 100 is shown that facilitates providing advertising content in conjunction with one or more thumbnails of content to be viewed after the advertisement.

Figure 7:
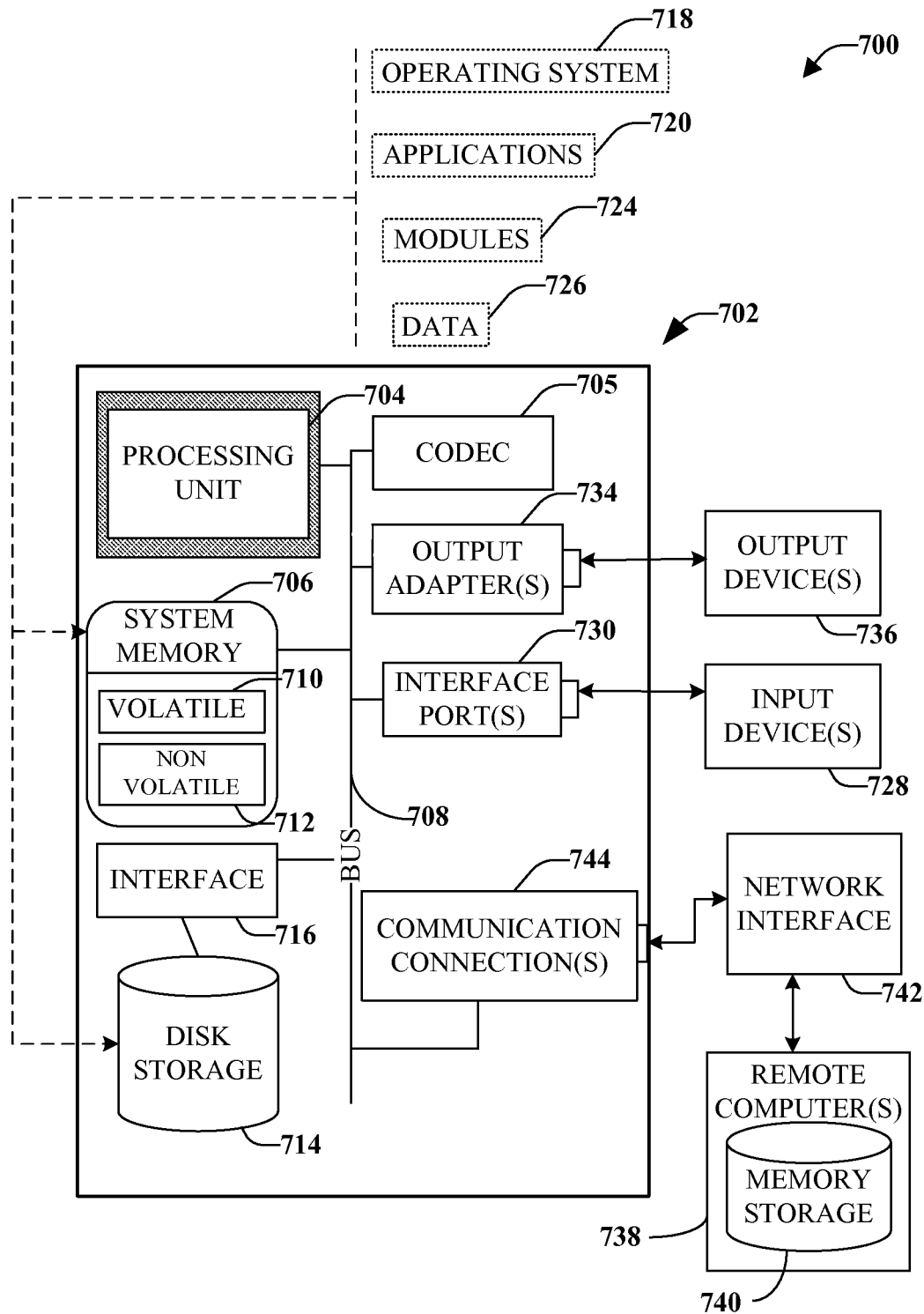
FIG. 7 illustrates a block diagram representing an exemplary non-limiting operating environment in which the various embodiments can be implemented.
Figure 8:
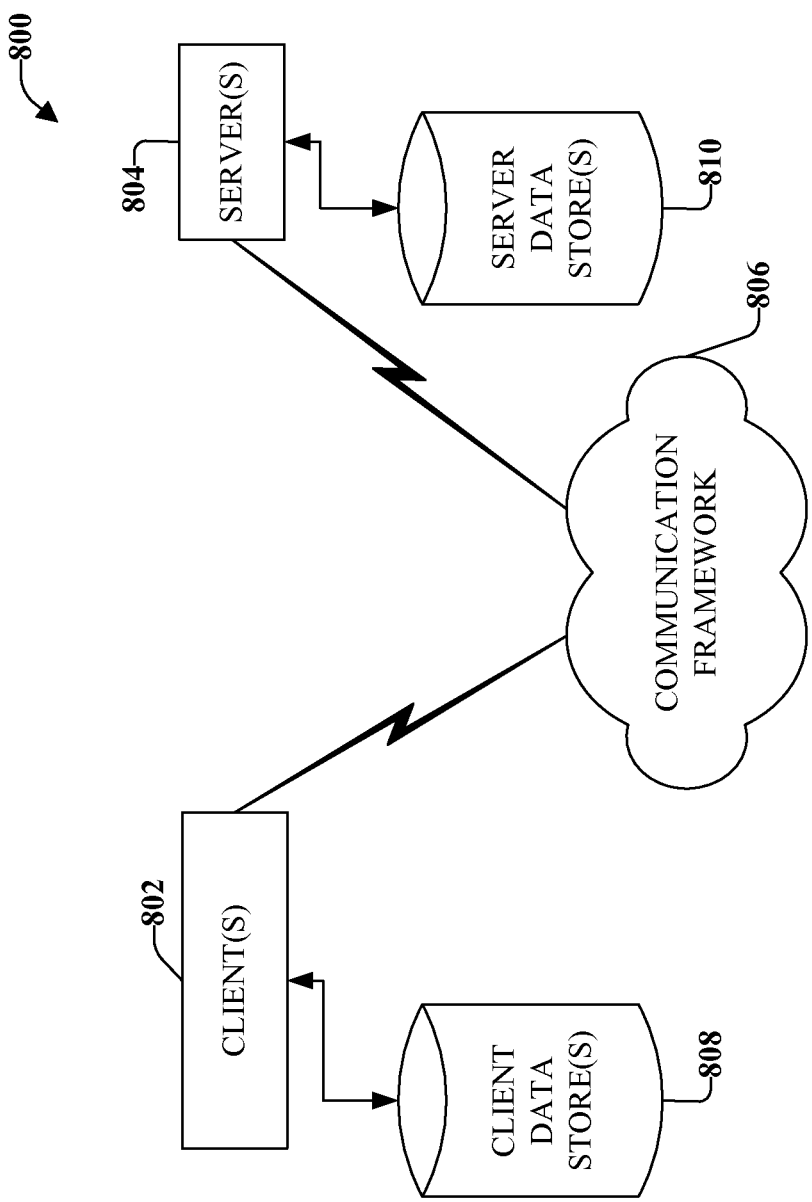
FIG. 8 illustrates a block diagram representing an exemplary non-limiting networked computing environment in which the various embodiments can be implemented.

Aspects of the systems, apparatuses or processes explained in this disclosure can constitute machine-executable component embodied within machine(s), e.g., embodied in one or more non-transitory computer readable mediums (or media) associated with one or more machines, non-limiting examples of which are illustrated in relation to FIGS. 7 and 8. Such component, when executed by the one or more machines, e.g., computer(s), computing device(s), virtual machine(s), etc. can cause the machine(s) to perform the operations described. Advertising delivery system 100 can include memory 102 for storing computer executable components and instructions. A processor 104 can facilitate operation of the computer executable components and instructions by the advertising delivery system 100.

In a non-limiting example, advertising delivery system 100 employs a thumbnail component 110, an ordering component 120, a caching component 130, and a presentation component 140. In an aspect, thumbnail component 110 generates one or more thumbnail views of content video(s) to be displayed after the video advertisement is completed or skipped. Ordering component 120 orders (ranks) respective content videos to be displayed after respective video advertisement(s) are viewed. The ordering of the thumbnails (which can correspond to the ordering of corresponding content videos to be displayed) can, for example, be a function of determined or inferred user interest, user context, relevance to user, advertiser preference, host site preference, or other criteria. Caching component 130 can cache respective video ads, content videos and associated thumbnails as a function of the ranking (e.g., to improve streaming speed, bandwidth utilization, buffering, or resource allocation), and presentation component 140 can transmit or present respective video ads, thumbnails of the content to be viewed as well as the content video(s). Presentation component 140 also presents additional functions and content in connection with the advertisement and content videos (e.g., headline for the advertisement, title of video, link to the video's watch page, a user voting or ranking feature (e.g., +1, like, dislike . . . ), learn more feature, countdown for time left in the advertisement, countdown of time left before the advertisement can be skipped . . . ).

Additionally, advertising delivery system 100 includes a memory 150 that can store video ads, content videos, and content thumbnails, as well as, data generated by thumbnail component 110, ordering component 120, caching component 130, and presentation component 140. Memory 150 can be stored on any suitable type of storage device, non-limiting examples of which are illustrated with reference to FIGS. 7 and 8.

The video ads, the content videos, or associated thumbnails can include data associated with one or more data sources (not shown) that can be accessed by a client device (not shown) or by a content delivery system such as advertising delivery system 100 (and additional systems described in this disclosure). For example, a data source can include a data store storing media content and affiliated with a content provider that interacts with the advertising delivery system 100. In another aspect, a data source can include a data store that stores media content remote from a content provider or an advertising delivery system 100.

A client device can include any suitable computing device associated with a user and configured to interact with or receive media content. For example, a client device can include a mobile device, a mobile phone, personal data assistant, laptop computer, tablet computer, desktop computer, server system, cable set top box, satellite set top box, cable modem, television set, media extender device, blu-ray device, DVD (digital versatile disc or digital video disc) device, compact disc device, video game system, audio/video receiver, radio device, portable music player, navigation system, car stereo, etc. Moreover, a client device can include a user interface (e.g., a web browser or application), that can receive and present displays and generated locally or remotely. It is to be appreciated that advertising delivery system 100 can be remote from the client device or can be included within the client device. As used in this disclosure, the terms "content consumer" or "user" refer to a person, entity, system, or combination thereof that employ advertising delivery system 100 (or additional systems described in this disclosure). In an aspect, a client device or advertising delivery system 100 (or additional systems described in this disclosure) can be configured to access media content via a wired or wireless network, such as for example the Internet, intranet, or cellular service.

Thumbnail component 110 generates thumbnails of content videos. In a non-limiting example, thumbnail component 110 can extract a thumbnail from metadata associated with a content video, for example a thumbnail that is supplied by the publisher of the content video. In another non-limiting example, thumbnail component 110 can analyze the content of a content video and select a video frame from the content video that is representative of the content video as the thumbnail. In a further example, thumbnail component 110 can analyze the content of a content video and select a plurality of frames representative of the content video to form a collage as the thumbnail. Furthermore, thumbnail component 110 can take into account information associated with a user that will view the content after the video advertisement to generate a thumbnail relevant to that user. For example, user preferences such as stored in a user profile or inferred by monitoring past user interactions with content videos or other content can be employed to determine user interest in order to generate a thumbnail that is relevant to the user.

In a non-limiting example, thumbnail component 110 can generate thumbnails as a function of inferred or determined user interest, for example, based on user preferences, historical views, user context, user location, user queries, etc. In a non-limiting example, thumbnail component 110 can determine thumbnails that are likely to be of interest to a user, for example using artificial intelligence, by examining logs storing user interaction with content, non-limiting examples or which include, user context, searches, navigation of a content, viewing content, social networking, browsing content, rating content, ranking content, purchasing content, like indication of content, dislike indication of content, and/or comments or annotations applied to content. In another example, user preferences stored in a user profile and/or inferred by monitoring user interaction with the client device can be employed to determine thumbnails of interest to a user. In a further example, user profiles for a user and/or friends of a user can provide shared preference settings or inferences of thumbnails that are of interest to groups of users. It is to be appreciated that any criteria can be employed for determining which thumbnails may be of interest to a user. Thumbnail component 110 can generate and associate a thumbnail to a content video based upon determinations of user interest.

Caching component 130 can cache video ads, content videos, or associated thumbnails in the memory 150 as a function of respective ordering of thereof. Caching component 130 can store cached media files/content (e.g. video ads, content videos, associated thumbnails, or other digital media) so that future requests for respective media files can be served quickly. The cached media files can be duplicates of corresponding sections of original media files which may be stored elsewhere. If the cached media files are requested, the request can be served by simply reading the cache, which is comparatively faster than reading the original media files. Hence, the greater the number of requests that can be served from the cached section, the faster overall performance of advertising delivery system 100 becomes. The cached media can be aged out of or persisted in the memory 150 as a function of ranking, staleness, relevance, etc. In an embodiment, multiple levels of cache can be employed; respective sections of media can be cached in respective caches as a function of ranking, ordering, demand, etc. For example, highest performance cache can be allocated to highest ranked and in most demand media files.

Figure 2:
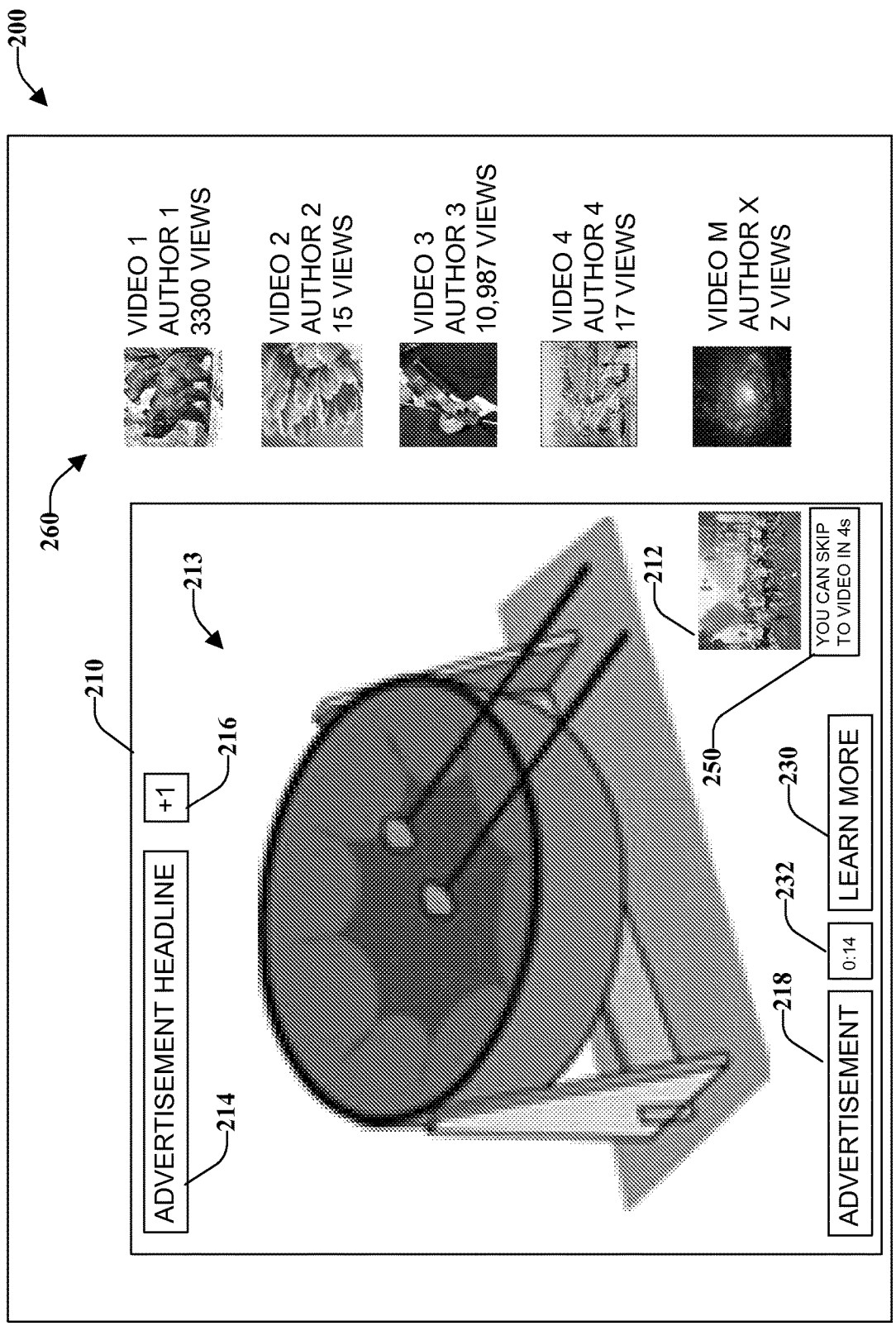
FIG. 2 illustrates an exemplary non-limiting display of a user interface for providing advertising content in conjunction with one or more thumbnails of content to be viewed after the advertisement in accordance with an implementation of this disclosure.

Referring to FIGS. 1 and 2, presentation component 140 can generate a display 200 that displays a video advertisement player 210 and a thumbnail 212 of video content to be displayed after a video advertisement 213. To facilitate user comprehension of what video advertisement 213 is being viewed, and what content video is upcoming, the presentation component can provide a variety of information and functionalities to enhance user viewing experience. In a non-limiting example, presentation component 140 can display an advertisement headline 214. When video ad 213 initially begins playing, an advertisement headline 214 can be shown for video ad 213 in the upper-left corner of the player, for example, over a semi-transparent background. It is to be appreciated that the functional and text features described in this document are not limited to any particular location or context, and can be provisioned in any suitable manner or location. For example, advertisement headline 214 can automatically fade after G seconds (G is an integer) but reappear if the user hovers a cursor/pointer over anywhere on the video advertisement player 210. In another example, if video ad 213 does not have an advertisement headline 214, optionally a title of video ad 213 can be displayed instead. If video ad 213 is hosted on a website, the title can link to the video ad's watch page. Furthermore, hovering over the title can show mouse-over text revealing a promotional slogan or the like related to video ad 213. Additionally, advertisement text 218 can be displayed, for example, at a bottom portion of the player. In a non-limiting example, advertisement text 218 can be static or dynamic text associated with video ad 213. In a further non-limiting example, advertisement text 218 can be customized to the user watching the video ad, for example, based on user preferences and/or interest.

Presentation component 140 can also provide a rating feature 216 (e.g., +1, −1, like, dislike rating feature . . . ) that allows the user to rate of video ad 213. Additionally, in a non-limiting example, hovering over the +1 button can show a +1 annotation which indicates who else has or the number of other who have +1'd video ad 213. For example, indications can be provided of friends of the user who have +1'd video ad 213.

Presentation component 140 can also provide a learn more button 230. Learn more button 230 can, for example, appear in yellow at the bottom middle area of the player, above video playback controls (not shown). It is to be appreciated that learn more button 230 can be displayed in any suitable manner or characteristics, non-limiting examples of which include color, shape, size, position, icon, or text. Learn more button 230 is clickable and can link the user to an advertiser's site associated with video ad 213, for example, where additional information regarding products or services associated with video ad 213 can be obtained or purchases can be made. In a non-limiting example, when the user clicks on the in-stream video ad 213, the video ad 213 can be paused, similar to the interactions for a content video.

In addition, presentation component 140 can provide an advertisement counter 232 that displays playing time left in video advertisement 213. Advertisement counter 232 can, for example, be placed directly right of the "Advertisement" text in the bottom left of the player. Doing so, can mitigate confusion associated with a skip counter 250 that count downs for when the user can skip video ad 213, if video ad 213 is skippable. For example, in a non-limiting example, a user may be required to watch the entire video advertisement 213 before being able to watch a content video. In this case, a skip counter 250 may not be presented. In another non-limiting example, a user may only be required to watch a certain portion (skip threshold) of video ad 213 before being able to view the content video. As such, skip counter 250 can reflect the time remaining before the user can leave video ad 213 and watch the content video. It is to be appreciated that a selectable skip button (not shown) can be displayed after the skip counter has reached a skip threshold that allows for skipping video ad 213. In another non-limiting example, thumb nail 212 can be enabled to be selected for skipping video 213 after the skip counter has reached the skip threshold that allows for skipping video ad 213. It is to be appreciated that the skip threshold can be based on a predetermined fixed length of playback time of a video ad, a percentage of playback time of the video ad, a dynamically adjusted length of playback time of a video ad, a length of playback time of a video ad based upon a length of content video to be viewed after the video ad, or other criteria.

In a further non-limiting example, presentation component 140 can also display (e.g., as a function of the ordering) additional thumbnails 260 of additional video content that can be viewed after the current content video, represented by thumbnail 212. It is to be appreciated that the additional video content may require viewing of additional video advertisements.

Additionally, presentation component 140 can present content viewing options for use with any suitable type of client device that receives media files. Client devices often have different capabilities and limitations (e.g., screen size, processors, decoders . . . ). In an aspect, the presentation component 140 can provide presentation options in accordance with different client device capabilities or limitations. For example, data rendering capabilities may be more limited in a mobile device (e.g., a smart-phone) than in a fixed computing device (e.g., a desktop computer), such as a larger percentage of client device processing resources may be required to present a media file, such as a video (or other information), on the mobile device than would be required in viewing the same media file on a fixed computing device. In addition, because displays of various mobile devices are often smaller and/or lower resolution than displays in fixed computing devices, it may be possible only to display a relatively small amount of information at any given time on a mobile device. Presentation component 140 can thus optimize display of options and content for respective devices. Furthermore, data connections between a mobile device and various networked resources (e.g., the Internet) may be slower than corresponding data connections between a fixed computing device and the same networked resources. Accordingly, presentation component 140 can generate user options to account for variations in device capabilities and available bandwidth for consumption and rendering of media content. For example, differing format or resolution versions of the same media file can be presented based upon client device capabilities and limitations. In a non-limiting example, a video ad, thumbnail or content video can be presented in a highly compressed encoding format and with lower resolution to a mobile device over a wireless network, while a lower compressed encoding format and higher resolution version of the same video ad, thumbnail or content video can be presented to a desktop computer on a wired network.

In view of the above, in an aspect, the presentation component 140 can present media content in various formats and/or in accordance with various display mediums. For example, in one embodiment, presentation component 140 can present a section of video in a format such as H.263, H.264 AVC, MPEG-4 SP, VP8, or other suitable format. In another embodiment the presentation component 140 may present an audio section in formats such as for example AAC LC/LTP, HE-AACv1(AAC+), HE-AACv2 (enhanced AAC+), AMR-NB, AMR-WB, FLAC, MP3, MIDI, Vorbis, PCM/WAVE, etc.

In an aspect, presentation component 140 can automatically configure or present user options to consume media content based on encoding parameters such as video resolution, video frame rate, video bit rate, video codec, audio codec, audio channels, audio bit rate, etc. Thus, presentation component 140 or a user may choose a format to consume media content that best suits capabilities of specific consumption mediums, available bandwidth, file size, processing capabilities, screen resolution, screen size, available encoders, available decoders, etc.

Figure 3:
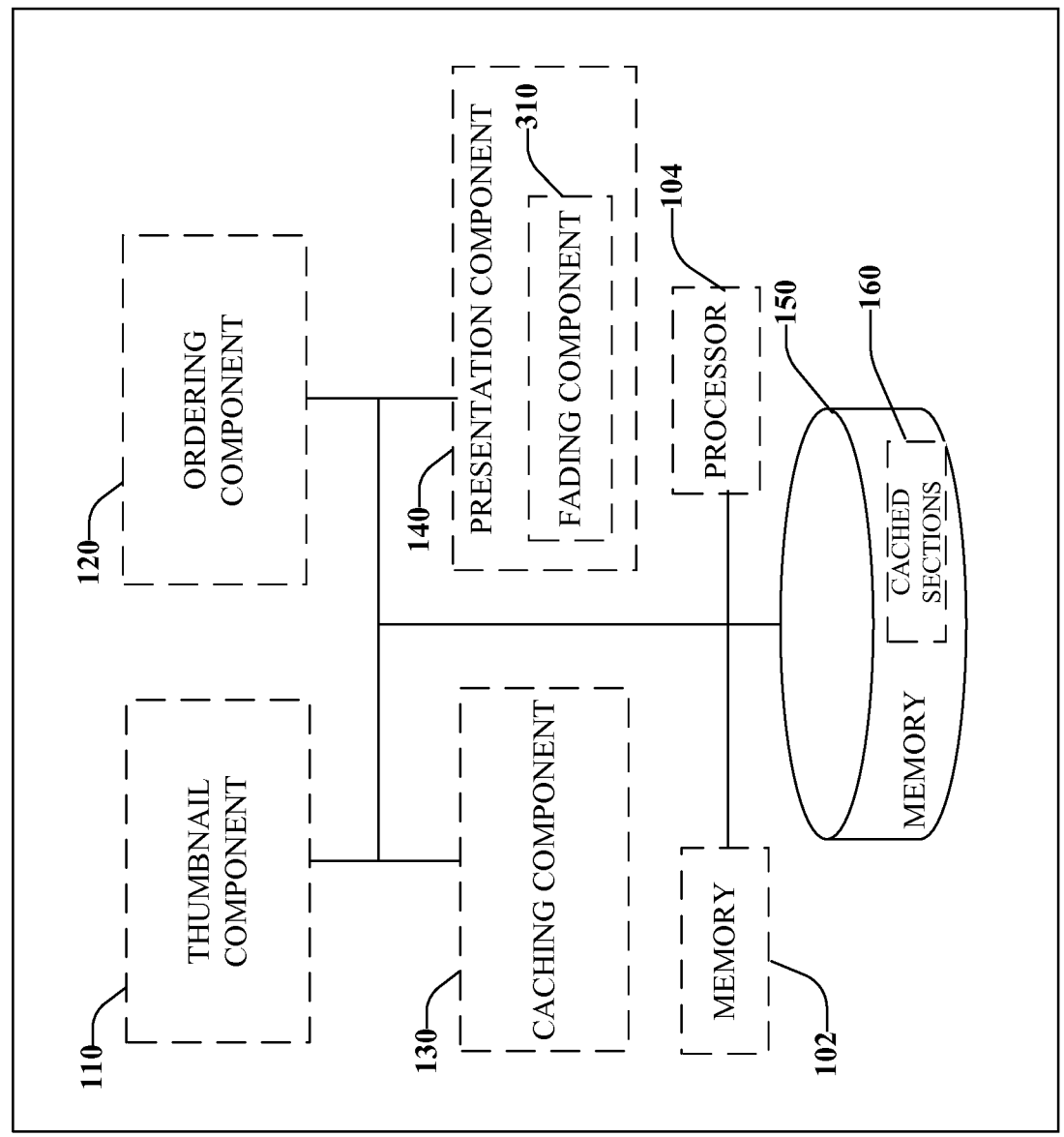
FIG. 3 illustrates a block diagram of an exemplary non-limiting system for fading a displayed thumbnail in relation to a video ad in accordance with an implementation of this disclosure.

Turning now to FIG. 3, also with reference to FIG. 2, presented is another non-limiting example of an advertising delivery system 300 in accordance with the subject disclosure. Advertising delivery system 300 employs thumbnail component 110, ordering component 120, caching component 130, presentation component 140, fading component 310, memory 102, memory 150, and cached sections 160. In an aspect, advertising delivery system 300 facilitates fading a thumbnail(s) in relation to a video ad. In non-limiting example, presentation component 140 employs a fading component 310 to control fading of a thumbnail in relation to a video ad. Fading component 310 can fade in or fade out respective thumbnails 212, 260 as a function of a variety of metrics. In a non-limiting example, as the video advertisement 213 progresses, the thumbnail 212 can increase in detail, resolution, color, opaqueness, and/or size, thereby enticing the user to finish watching the video advertisement 213. In addition fading component 310, can apply other transforms to the respective thumbnails 212, 260, such x/y translations. Furthermore, additional information, such as text or graphics, about the upcoming video content to be displayed after the video advertisement 213 can be added and/or removed as part of the fading to further entice the user to watch the video advertisement. It is to further be appreciated that the additional information can be presented in a glanceable manner, so as not to overly distract the user from the video ad. In a non-limiting example, fading component 310 can fade in or out a thumbnail after a predetermined fading threshold, such as, a fixed length of playback time of a video ad, a percentage of playback time of the video ad, a dynamically adjusted length of playback time of a video ad, a length of playback time of a video ad based upon a length of content video to be viewed after the video ad, or other criteria. Furthermore, the rate of fading can be fixed or dynamically adjusted, for example, as a function of the amount of playback time left for the video ad.

Figure 4:
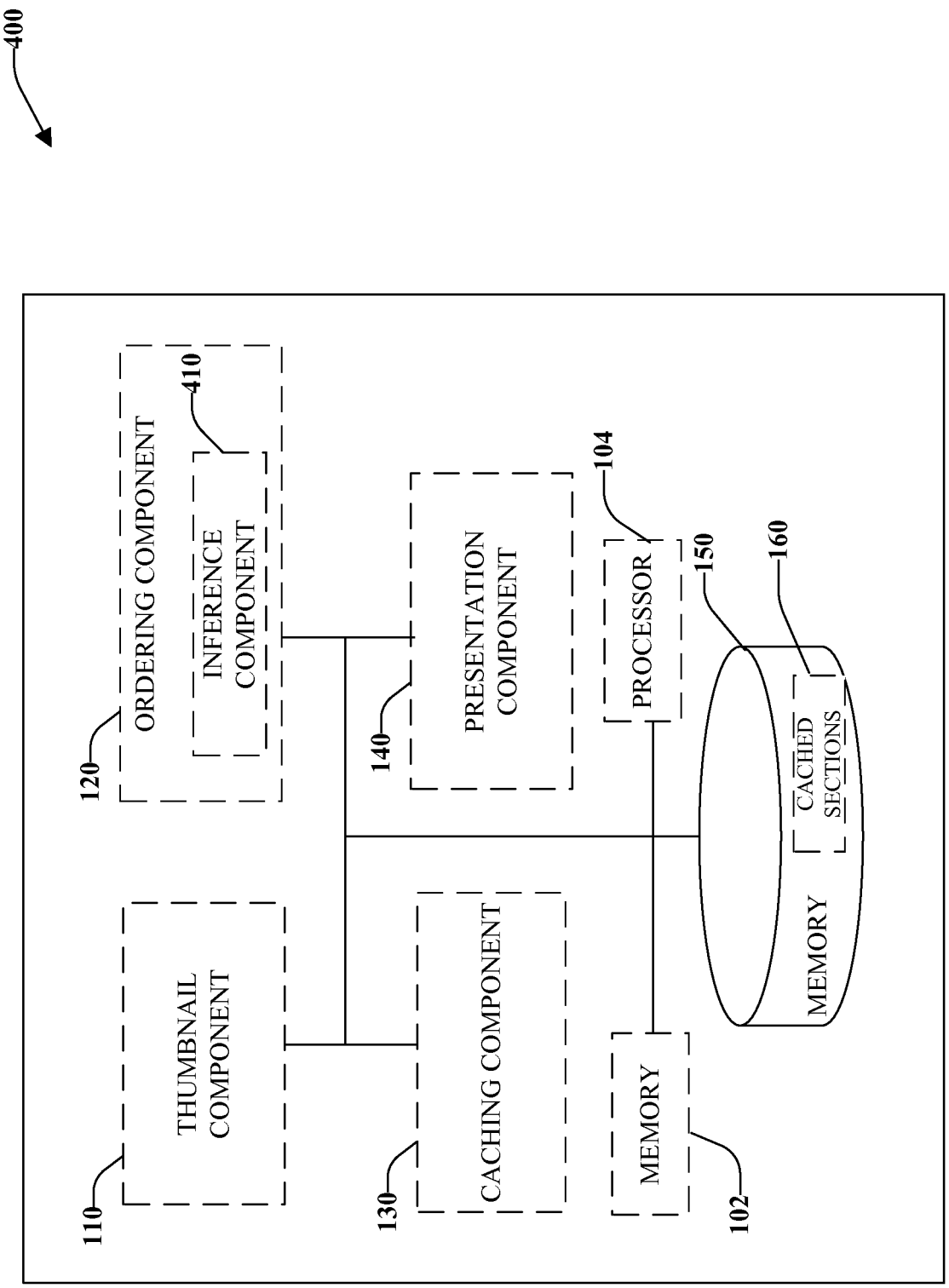
FIG. 4 illustrates a block diagram of an exemplary non-limiting system for making inferences in connection with generating thumbnails of content videos in accordance with an implementation of this disclosure.

Referring now to FIG. 4, presented is another non-limiting example of an advertising delivery system 400 in accordance with the subject disclosure. Advertising delivery system 400 employs thumbnail component 110, ordering component 120, inference component 410, caching component 130, presentation component 140, memory 102, memory 150, and cached sections 160. In an aspect, advertising delivery system 300 facilitates inferring user interest in order to generate a thumbnail for a content video that is to be played for a user after a video advertisement. In non-limiting example, ordering component 120 employs an inference component 410 infer user interests. In a non-limiting example, ordering component 120 can employ an inference component 410 to facilitate making inferences or determinations in connection with generating thumbnails for video content. In an aspect, inference component 410 can infer user desirability of a thumbnail based on a plurality of factors including but not limited to, user interest, monitored information including characteristics and features of media content, user preference, user demographics, user location, user viewing intent, or any other criteria associated with users, content, or video ads.

In order to provide for or aid in the numerous inferences described in this disclosure (for example, inferring characteristics associated with media files, video ads, and/or users), inference component 410 can examine the entirety or a subset of data to which it is granted access and can provide for reasoning about or inferring relevancy to and desirability of viewing respective content sections by respective content consumers. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events or data.

Such inference can result in construction of new events or actions from a set of observed events or stored event data, whether or not the events are correlated in close temporal proximity, and whether the events and data come from one or several event and data sources. Various classification (explicitly or implicitly trained) schemes or systems (e.g., support vector machines, neural networks, expert systems, Bayesian belief networks, fuzzy logic, data fusion engines, etc.) can be employed in connection with performing automatic or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used in this disclosure also is inclusive of statistical regression that is utilized to develop models of priority.

Figure 5:
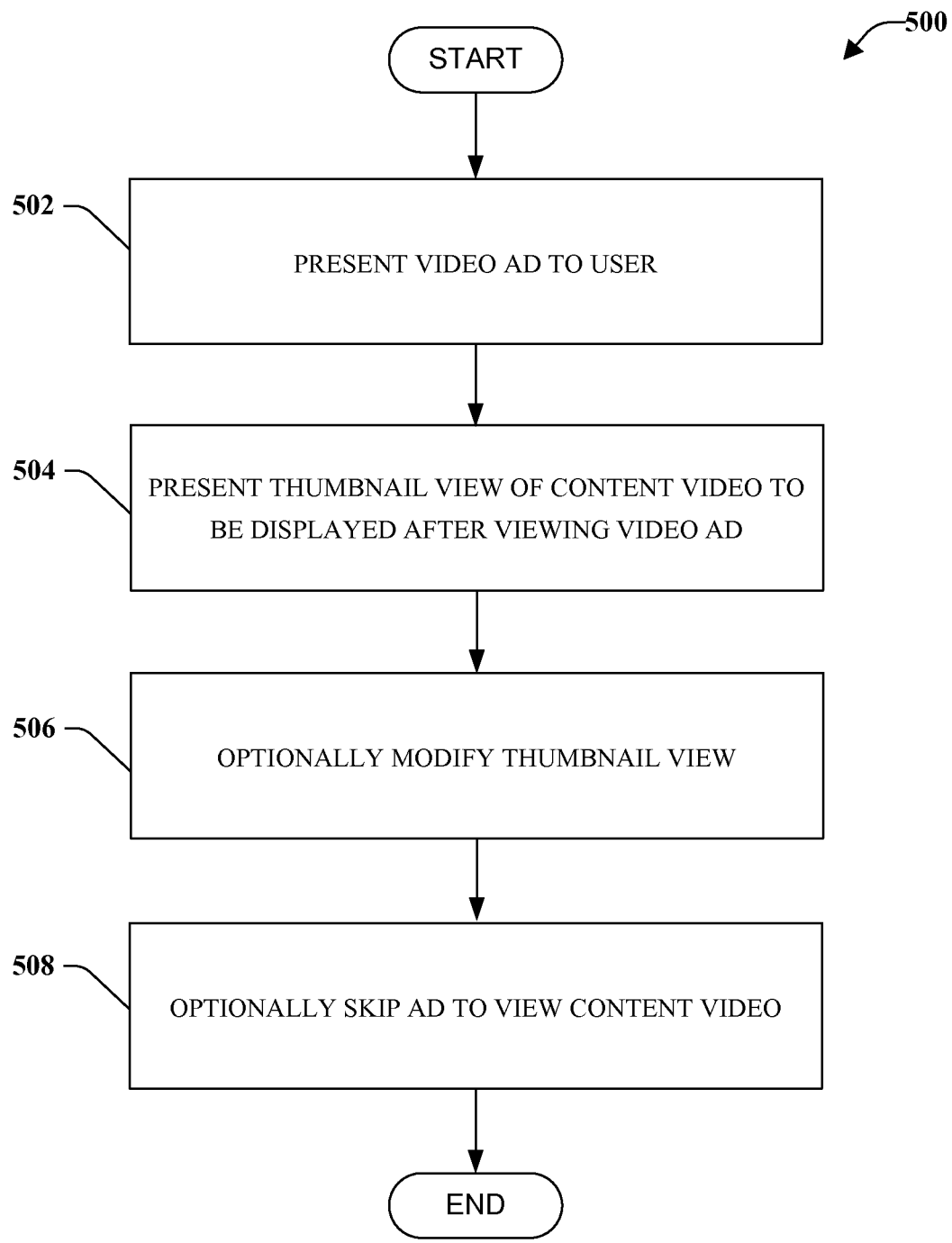
FIG. 5 illustrates an exemplary non-limiting flow diagram for presenting thumbnails of video content to be displayed after a video advertisement in accordance with an implementation of this disclosure.
Figure 6:
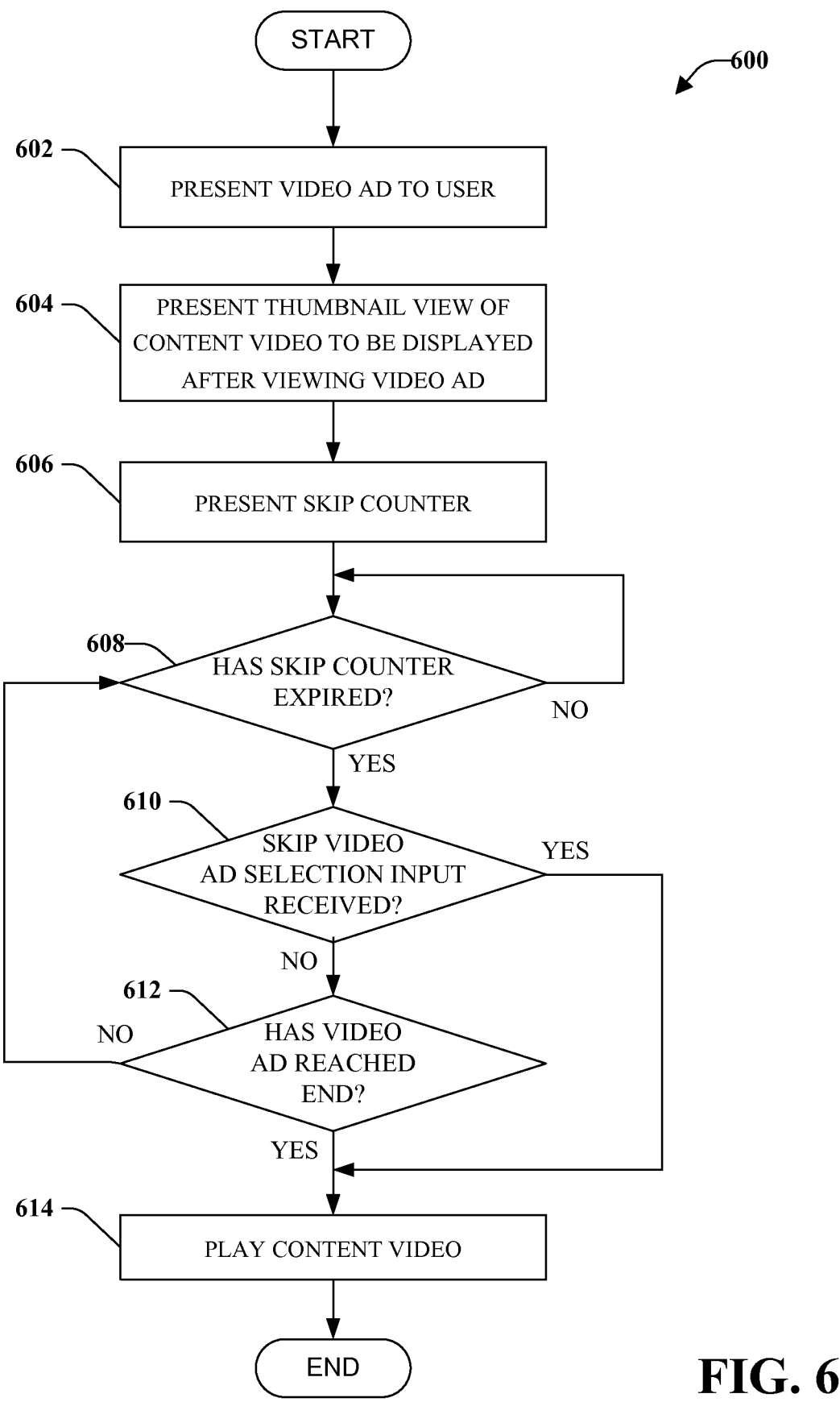
FIG. 6 illustrates an exemplary non-limiting flow diagram for presenting thumbnails of video content to be displayed after a video advertisement, and skipping the video ad in accordance with an implementation of this disclosure.

FIGS. 5 and 6 illustrate various methodologies in accordance with certain aspects of this disclosure. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 5, an exemplary methodology 500 for presenting thumbnails of video content to be displayed after a video advertisement is illustrated. At 502, a video ad is presented to a user (e.g., by presentation component 140). At 504, a thumbnail of video content to be viewed after the advertisement has been watched or skipped is presented while the video ad is presented (e.g., by thumbnail component 110, ordering component 120, and/or presentation component 140). It is to be appreciated that the thumbnail can optionally be displayed prior to the advertisement being displayed. At 506, the thumbnail can be optionally modified (e.g., by fading component 310). At 508, the video ad can optionally be skipped (e.g., if the ad is skippable) in order to view the video content associated with the thumbnail (e.g., by thumbnail component 110 and/or presentation component 140).

Referring now to FIG. 6, an exemplary methodology 600 for presenting thumbnails of video content to be displayed after a video advertisement, and skipping the video ad is illustrated. At 602, a video ad is presented to a user (e.g., by presentation component 140). At 604, a thumbnail of video content to be viewed after the advertisement has been watched or skipped is presented while the video ad is presented (e.g., by thumbnail component 110, ordering component 120, and/or presentation component 140). It is to be appreciated that the thumbnail can optionally be displayed prior to the advertisement being displayed. At 606, a skip counter is presented to user showing an amount of time before the user can skip the video ad and begin playing the video content (e.g., by presentation component 140). At 608, a determination is made whether the skip counter has reached the end of its count such that a user can make a selection to skip the video ad and begin playing the content video (e.g., by presentation component 140). If the determination at 608 is "NO" or false, indicating that the counter has not reached the end of its count, the method will proceed to 608. If the determination is "YES" or true, indicating that the counter has reached the end of its count, the method will proceed to 610. At 610, a determination is made whether input is receiving from a user indicating that they would like to skip the video ad (e.g., by presentation component 140). If the determination at 610 is "NO" or false, indicating that the user has not provided input indicating that they would like to skip the video ad, the method will proceed to 612. If the determination is "YES" or true, indicating that the user has provided input indicating that they would like to skip the video ad, the method will proceed to 614. At 612, a determination is made whether the video ad has reached the end of its playback (e.g., by presentation component 140). If the determination at 612 is "NO" or false, indicating that video ad has not reached the end of its playback, the method will proceed to 610. If the determination is "YES" or true, indicating that video ad has reached the end of its playback, the method will proceed to 614. At 614, the content video is played for the user (e.g., by presentation component 140).

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described in this disclosure. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be effected across a plurality of devices. Accordingly, the invention is not to be limited to any single embodiment, but rather can be construed in breadth, spirit and scope in accordance with the appended claims.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

With reference to FIG. 7, a suitable environment 700 for implementing various aspects of the claimed subject matter includes a computer 702. The computer 702 includes a processing unit 704, a system memory 706, a codec 705, and a system bus 708. The system bus 708 couples system components including, but not limited to, the system memory 706 to the processing unit 704. The processing unit 704 can be any of various available processors. Dual microprocessors and other multiprocessor architectures also can be employed as the processing unit 704.

The system bus 708 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 706 includes volatile memory 710 and non-volatile memory 712. The basic input/output system (BIOS), containing the basic routines to transfer information between elements within the computer 702, such as during start-up, is stored in non-volatile memory 712. In addition, according to present innovations, codec 705 may include at least one of an encoder or decoder, wherein the at least one of an encoder or decoder may consist of hardware, a combination of hardware and software, or software. Although, codec 705 is depicted as a separate component, codec 705 may be contained within non-volatile memory 712. By way of illustration, and not limitation, non-volatile memory 712 can include read only memory (ROM), programmable ROM (PROM), electrically programmable ROM (EPROM), electrically erasable programmable ROM (EEPROM), or flash memory. Volatile memory 710 includes random access memory (RAM), which acts as external cache memory. According to present aspects, the volatile memory may store the write operation retry logic (not shown in FIG. 7) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 702 may also include removable/non-removable, volatile/non-volatile computer storage medium. FIG. 7 illustrates, for example, disk storage 714. Disk storage 714 includes, but is not limited to, devices like a magnetic disk drive, solid state disk (SSD) floppy disk drive, tape drive, Jaz drive, Zip drive, LS-70 drive, flash memory card, or memory stick. In addition, disk storage 714 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 714 to the system bus 708, a removable or non-removable interface is typically used, such as interface 716.

It is to be appreciated that FIG. 7 describes software that acts as an intermediary between users and the basic computer resources described in the suitable operating environment 700. Such software includes an operating system 718. Operating system 718, which can be stored on disk storage 714, acts to control and allocate resources of the computer system 702. Applications 720 take advantage of the management of resources by operating system 718 through program modules 724, and program data 726, such as the boot/shutdown transaction table and the like, stored either in system memory 706 or on disk storage 714. It is to be appreciated that the claimed subject matter can be implemented with various operating systems or combinations of operating systems.

A user enters commands or information into the computer 702 through input device(s) 728. Input devices 728 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 704 through the system bus 708 via interface port(s) 730. Interface port(s) 730 include, for example, a serial port, a parallel port, a game port, and a universal serial bus (USB). Output device(s) 736 use some of the same type of ports as input device(s) 728. Thus, for example, a USB port may be used to provide input to computer 702, and to output information from computer 702 to an output device 736. Output adapter 734 is provided to illustrate that there are some output devices 736 like monitors, speakers, and printers, among other output devices 736, which require special adapters. The output adapters 734 include, by way of illustration and not limitation, video and sound cards that provide a means of connection between the output device 736 and the system bus 708. It should be noted that other devices and/or systems of devices provide both input and output capabilities such as remote computer(s) 738.

Computer 702 can operate in a networked environment using logical connections to one or more remote computers, such as remote computer(s) 738. The remote computer(s) 738 can be a personal computer, a server, a router, a network PC, a workstation, a microprocessor based appliance, a peer device, a smart phone, a tablet, or other network node, and typically includes many of the elements described relative to computer 702. For purposes of brevity, only a memory storage device 740 is illustrated with remote computer(s) 738. Remote computer(s) 738 is logically connected to computer 702 through a network interface 742 and then connected via communication connection(s) 744. Network interface 742 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN)

and variations thereon, packet switching networks, and Digital Subscriber Lines (DSL).

Communication connection(s) 744 refers to the hardware/software employed to connect the network interface 742 to the bus 708. While communication connection 744 is shown for illustrative clarity inside computer 702, it can also be external to computer 702. The hardware/software necessary for connection to the network interface 742 includes, for exemplary purposes only, internal and external technologies such as, modems including regular telephone grade modems, cable modems and DSL modems, ISDN adapters, and wired and wireless Ethernet cards, hubs, and routers.

Referring now to FIG. 8, there is illustrated a schematic block diagram of a computing environment 800 in accordance with this disclosure. The system 800 includes one or more client(s) 802 (e.g., laptops, smart phones, PDAs, media players, computers, portable electronic devices, tablets, and the like). The client(s) 802 can be hardware and/or software (e.g., threads, processes, computing devices). The system 800 also includes one or more server(s) 804. The server(s) 804 can also be hardware or hardware in combination with software (e.g., threads, processes, computing devices). The servers 804 can house threads to perform transformations by employing aspects of this disclosure, for example. One possible communication between a client 802 and a server 804 can be in the form of a data packet transmitted between two or more computer processes wherein the data packet may include video data. The data packet can include a metadata, e.g., associated contextual information, for example. The system 800 includes a communication framework 806 (e.g., a global communication network such as the Internet, or mobile network(s)) that can be employed to facilitate communications between the client(s) 802 and the server(s) 804.

Communications can be facilitated via a wired (including optical fiber) and/or wireless technology. The client(s) 802 include or are operatively connected to one or more client data store(s) 808 that can be employed to store information local to the client(s) 802 (e.g., associated contextual information). Similarly, the server(s) 804 are operatively include or are operatively connected to one or more server data store(s) 810 that can be employed to store information local to the servers 804.

In one embodiment, a client 802 can transfer an encoded file, in accordance with the disclosed subject matter, to server 804. Server 804 can store the file, decode the file, or transmit the file to another client 802. It is to be appreciated, that a client 802 can also transfer uncompressed file to a server 804 and server 804 can compress the file in accordance with the disclosed subject matter. Likewise, server 804 can encode video information and transmit the information via communication framework 806 to one or more clients 802.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A method, comprising:
   generating a thumbnail associated with video content, the video content to be provided for playback after playback of a video advertisement; and
   presenting the thumbnail during the playback of the video advertisement to inform a user of the video content, wherein a skip counter indicative of time left until skipping of the video advertisement is enabled is provided, and wherein the time left is less than a remaining playing time of the video advertisement.

2. The method of claim 1, further comprising fading in detail of the thumbnail as the advertisement progresses.

3. The method of claim 1, further comprising receiving user rating input regarding the advertisement video or the video content.

4. The method of claim 1, further comprising displaying a selectable learn more button linked to a website associated with the advertisement.

5. The method of claim 1, further comprising displaying an advertisement counter that displays time left until playback of the advertisement video is complete.

6. The method of claim 1, further comprising displaying a selectable skip to video content button enabled to end display of the video advertisement and begin display of the video content.

7. The method of claim 6, further comprising enabling the selectable skip to video content button after a predetermined playing time of the video advertisement has completed.

8. The method of claim 1, further comprising using artificial intelligence to infer user interest, wherein generating the thumbnail is based on the inferred user interest.

9. The method of claim 8, wherein using artificial intelligence to infer user interest includes using a classifier to infer user interest.

10. The method of claim 9, wherein the classifier is a support vector machine or a neural network.

11. A system, comprising:
a memory having stored thereon computer executable components; and
a processor configured to execute the following computer executable components stored in the memory:
- a thumbnail component that generates a thumbnail associated with video content, the video content to be provided for playback after playback of a video advertisement; and
- a presentation component that presents the thumbnail during the playback of the video advertisement to inform a user of the video content, wherein a skip counter indicative of time left until skipping the video advertisement is enabled is provided, and wherein the time left is less than a remaining playing time of the video advertisement.

12. The system of claim 11, further comprising a fading component that increases resolution of the thumbnail as the advertisement progresses.

13. The system of claim 11, wherein the presentation component displays a rating function that receives user rating input regarding the video advertisement or the video content.

14. The system of claim 11, wherein the presentation component displays a selectable learn more button linked to a website associated with the video advertisement.

15. The system of claim 11, wherein the presentation component displays an advertisement counter that displays time left until playback of the displayed video advertisement is complete.

16. The system of claim 11, wherein the presentation component displays a selectable skip to video content button enabled to end display of the video advertisement and begin display of the video content.

17. The system of claim 16, wherein the selectable skip to video content button is enabled after a predetermined playing time of the video advertisement has completed.

18. The system of claim 11, wherein the processor is further configured to execute an inference component that uses artificial intelligence to infer user interest, and wherein the thumbnail component generates the thumbnail based on the inferred user interest.

19. The system of claim 18, wherein using artificial intelligence to infer user interest includes using a classifier to infer user interest.

20. The system of claim 19, wherein the classifier is a support vector machine or a neural network.

21. A non-transitory computer-readable medium having instructions stored thereon that, in response to execution, cause at least one device to perform operations comprising:
generating a thumbnail associated with video content, the video content to be provided for playback after playback of a video advertisement; and
presenting the thumbnail during the playback of the video advertisement to inform a user of the video content, wherein a skip counter indicative of time left until skipping of the video advertisement is enabled is provided, and wherein the time left is less than a remaining playing time of the video advertisement.

22. The non-transitory computer-readable medium of claim 21, wherein the at least one device is to perform operations further comprising receiving user rating input regarding the advertisement video or the video content.

23. The non-transitory computer-readable medium of claim 21, wherein the at least one device is to perform operations further comprising displaying a selectable learn more button linked to a website associated with the advertisement.

24. The non-transitory computer-readable medium of claim 21, wherein the at least one device is to perform operations further comprising displaying an advertisement counter that displays time left until playback of the advertisement video is complete.

25. The non-transitory computer-readable medium of claim 21, wherein the at least one device is to perform operations further comprising displaying a selectable skip to video content button enabled to end display of the video advertisement and begin display of the video content.

26. The non-transitory computer-readable medium of claim 25, wherein the at least one device is to perform operations further comprising enabling the selectable skip to video content button after a predetermined playing time of the video advertisement has completed.

* * * * *